Figure 1:
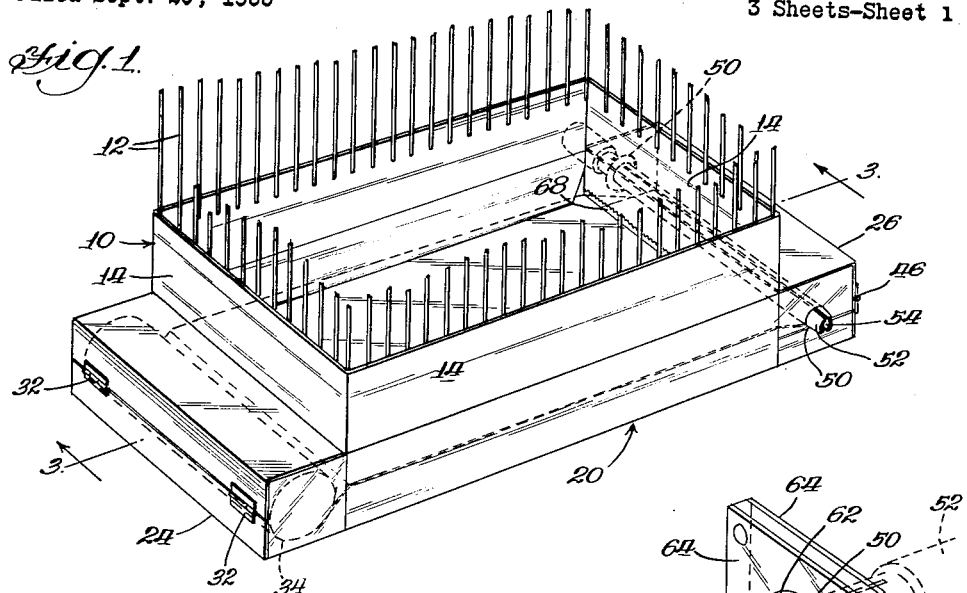

May 9, 1961  V. C. LINGIS  2,983,251
ANIMAL CAGE
Filed Sept. 29, 1955  3 Sheets-Sheet 1

INVENTOR.
Victor C. Lingis
BY

May 9, 1961 V. C. LINGIS 2,983,251
ANIMAL CAGE
Filed Sept. 29, 1955 3 Sheets-Sheet 2
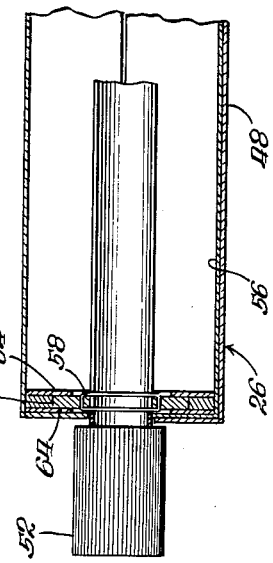
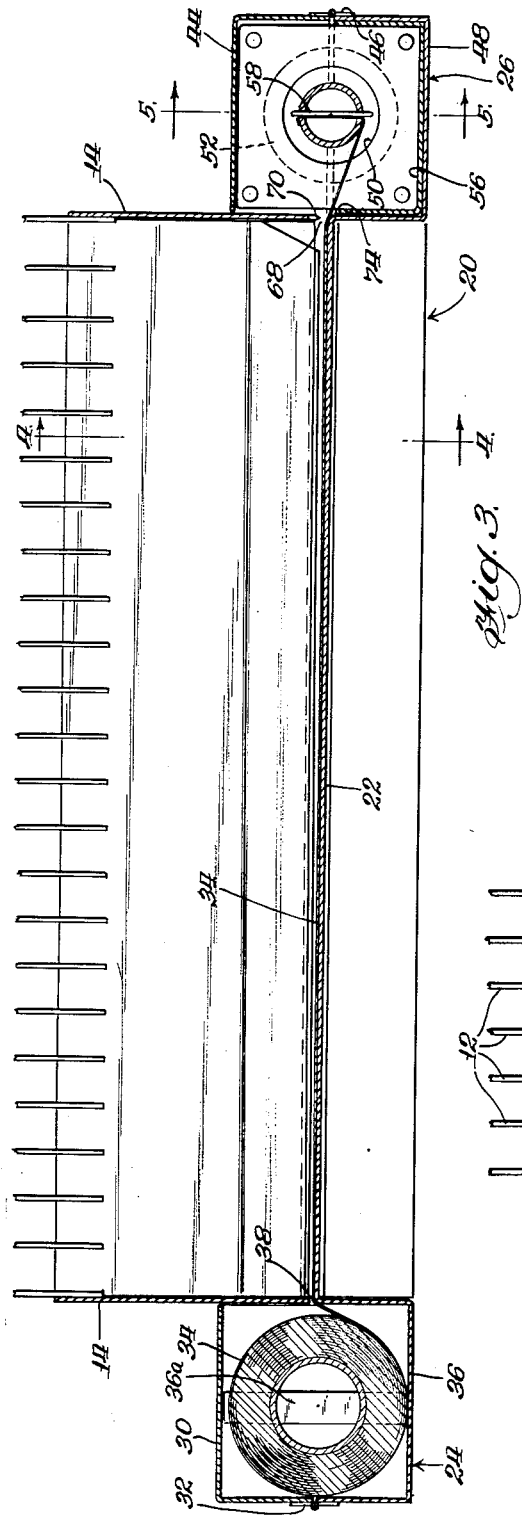
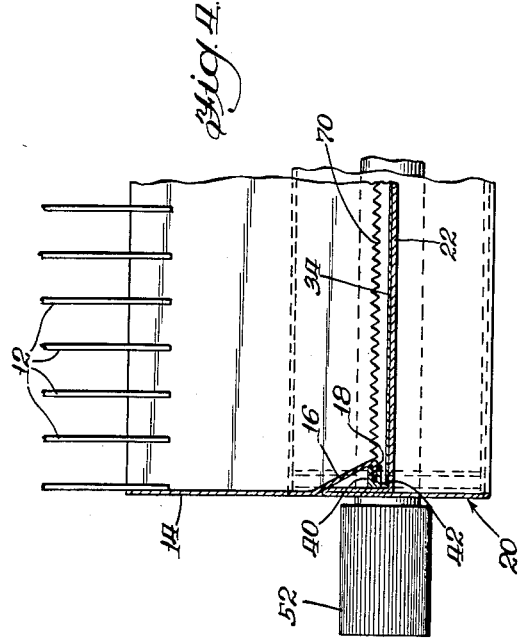
INVENTOR.
Victor C. Lingis
BY May 9, 1961 V. C. LINGIS 2,983,251
ANIMAL CAGE
Filed Sept. 29, 1955 3 Sheets-Sheet 3

INVENTOR.
Victor C. Lingis
BY
Atty.

United States Patent Office 2,983,251
Patented May 9, 1961

2,983,251

ANIMAL CAGE

Victor C. Lingis, % Mrs. L. Lingier, 6023 S. Keating Ave., Chicago, Ill.

Filed Sept. 29, 1955, Ser. No. 537,360

1 Claim. (Cl. 119—17)

The invention relates to an animal cage and particularly to a readily cleanable bottom arrangement therefor.

While the herein-disclosed invention is susceptible to use on many types of animal cages, it is particularly advantageous when incorporated in small animal cages, such as, for example, a bird cage. Therefore, in considering the invention herein, primary reference will be given to cages such as bird cages with the understanding that other adaptations can readily be made.

It is a well known fact that it is becoming increasingly more popular, in large segments of the population, to keep pets, such as, canaries, parakeets, and the like around the home. Many persons familiar with this business feel an even greater popularity would result but for the cleaning difficulty associated with the maintenance of such pets. In present day bird cages, for example, the bottom of the cage becomes extremely dirty with light, willowy or dusty material, such as, feathers, seed hulls, dried excreta and other finely powdered material. In such cages, the bottoms must usually be removed for cleaning and it is in this cleaning operation that a major problem presents itself. Because of the light characteristics of the matter on the cage bottom, extreme care must be used to prevent spilling of such matter. Even normal movement of the bottom through the air to a refuse container may, and frequently does, cause some of the matter to fly off the bottom. Besides the problem of dirtying the home, many persons feel extremely uncomfortable at the thought that they and other members of their household may be breathing this easily disturbed material. It has also been found that many persons would maintain such pets but for the unsightly appearance of a dirty cage bottom, the alternative to which is an unreasonable amount of attention and effort keeping the bottom clean.

Accordingly, it is a primary object of the invention to provide a simple and comparatively effortless means to clean a cage bottom and to maintain said bottom in a virtually continuous clean condition.

It is a further object of the invention to provide a means to easily clean the cage bottom without the necessity of removing the bottom.

It is still a further object of the invention to provide a cleaning means of the type described wherein dirt and the like that is removed from the cage bottom is, in effect, "packaged" for easy disposal.

It is yet another object of the invention to provide a cage and bottom arrangement therefor having at one side thereof a storage place for fresh bottom covers and at the other side thereof a storage place for the dirty bottom covers.

It is a specific object of the invention to provide, with the storage arrangements described, simple means to change the bottom cover.

Figure 2:
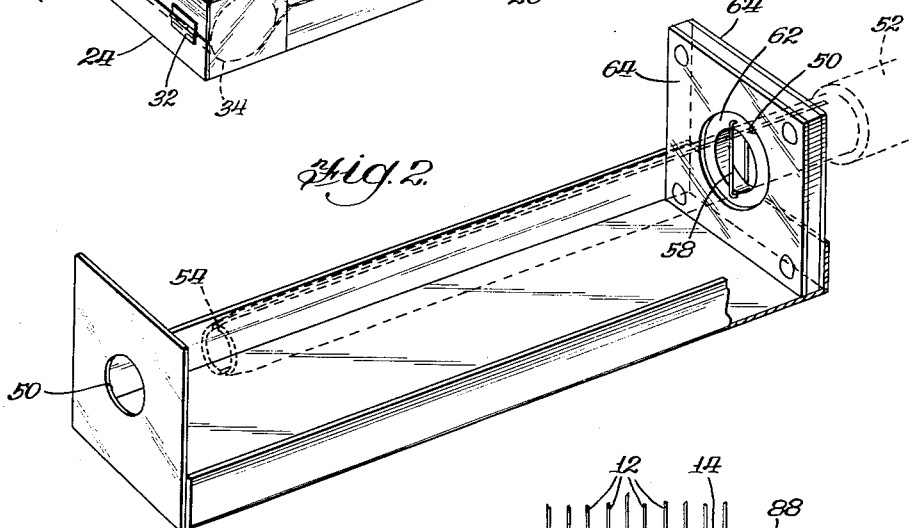
Figure 7:
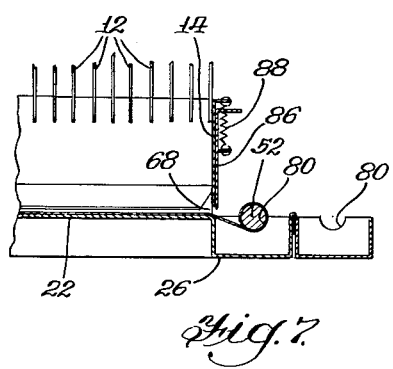
Figure 6:
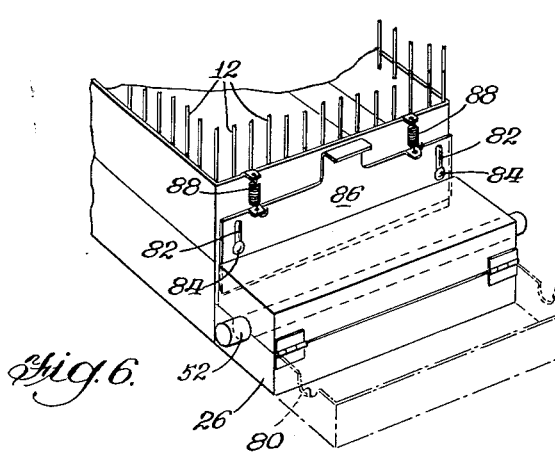
Figure 8:
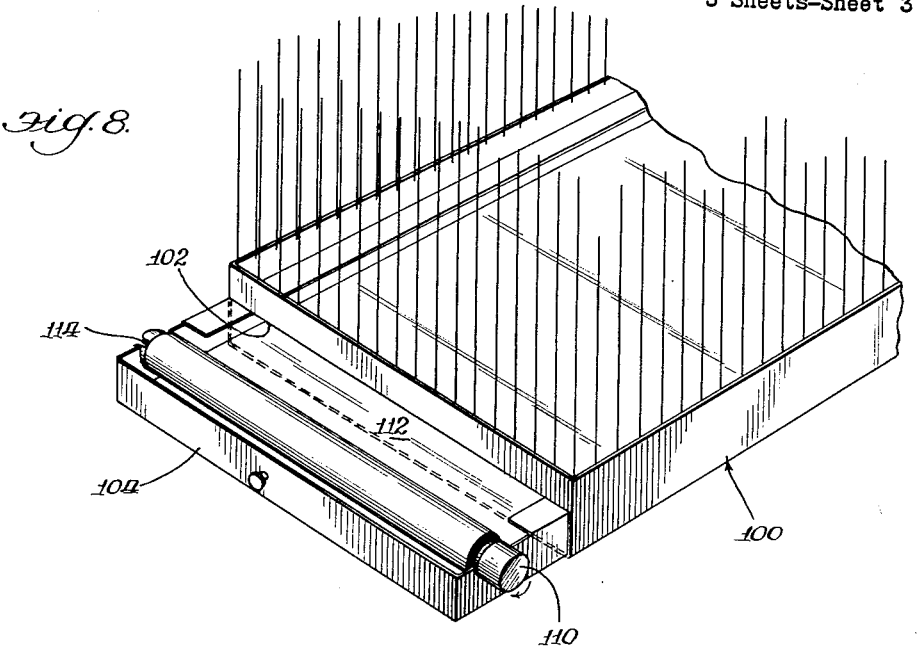
Figure 9:
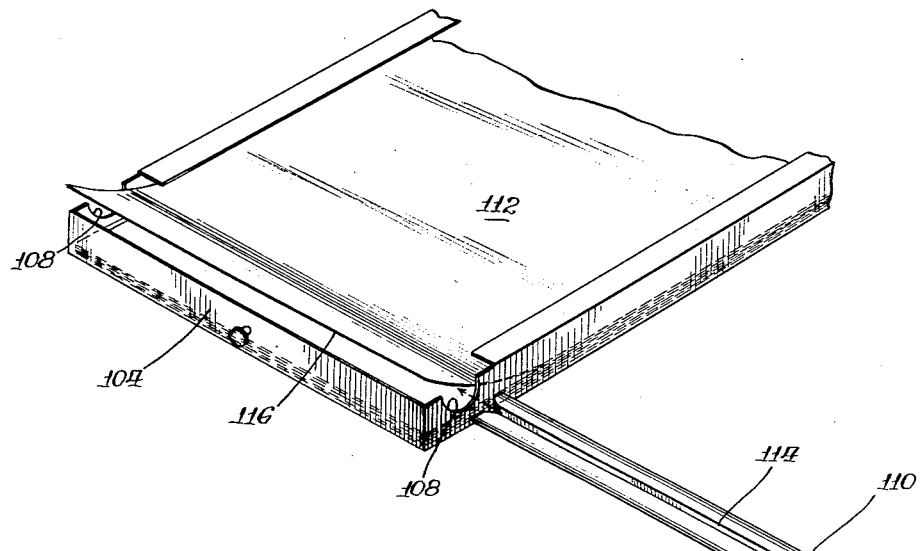

With the understanding that it is the general object of the invention to solve the abovementioned problems heretofore incident to pet maintenance, attention is directed to the following specification for a better understanding of the advantages of the invention and particularly to the associated drawings, wherein:

Figure 1 is a fragmentary perspective view of an animal cage arrangement incorporating the invention, Figure 2 is an enlarged fragmentary view of an end of the arrangement, Figure 3 is an enlarged sectional view taken along line 3—3 of Figure 1, Figure 4 is an enlarged sectional view taken along line 4—4 of Figure 3, Figure 5 is an enlarged fragmentary sectional view taken along 5—5 of Figure 3, Figure 6 is an enlarged perspective view illustrating an alternate embodiment of the invention, Figure 7 is a sectional view taken along line 7—7 of Figure 6, Figure 8 is a fragmentary perspective view of yet another arrangement of the invention, and Figure 9 is a fragmentary sectional view of the tray utilized in the embodiment of Figure 8.

Describing the invention in detail, attention is directed to Figure 1, wherein, the numeral 10 indicates an animal cage such as a bird cage. It is to be understood that upper mesh portion of the cage is only fragmentarily shown in view of the fact that it is not per se part of the invention. The cage 10 may be of rectangular form and additionally comprise a lower peripherally arranged rectangular sheet metal portion 14, said portion 14 having certain lower edges thereof, a pair of inwardly directed segments 16 which in turn presents outwardly directed flanges 18, as is best seen in Figure 4.

The cage 10 is provided with a bottom arrangement indicated generally at 20, said bottom arrangement comprising first a centrally located floor portion 22 (Figure 3) which forms the bottom of the enclosed cage 10. The bottom arrangement 20 is further provided with compartments 24 and 26 preferably located along opposite sides of the cage 10. It will be understood that the compartments 24 and 26 may be located at various parts of the cage or may be positioned in juxtaposition with any extension of the cage, such as a play pen (not shown) which is frequently mounted outside the cage door.

In the embodiment illustrated the compartments 24 and 26 are shown to be of rectangular form, it being understood, however, that any geometric form may be employed it being sufficient that each compartment present a material chamber to receive certain floor covering material as will hereinafter be described in detail.

Considering the compartment 24, it will be noted that the upper portion on top 30 is hinged as at 32 to a lower portion 36, whereby the portion 30 may be pivoted to open position and a roll of paper or other suitable floor covering material deposited therein. While in the preferred embodiment the floor covering 34 is illustrated in roll form it will be understood that the floor covering material may be stored in the compartment 24 in other forms such as in a flat condition without departing from the operative features of the invention. An aperture 38 is provided in the wall 14 immediately adjacent the compartment 24 and generally parallel to the long axis of said compartment, whereby the material 34 may be threaded through the aperture and across the cage bottom 22. The aperture 38 may be as long as desired, but is preferably of such length as will accommodate material 34 having a dimension sufficient to cover the floor portion 22. Specifically, the aperture 38 may be defined by the lower edge of the sheet metal portion 14 and the adjacent end of the bottom of the floor 22.

The bottom arrangement 20 is provided with opposed inwardly directed U-slot members 40 arranged preferably to extend along the long sides of the cage. These slots 40 are arranged to receive the outwardly directed flanges 18 on the sides of the cage 10 whereby the bottom arrangement 20 is demountably and slidably attached to the cage. The members 40 additionally define, with the cage floor 22, elongated guide slots 42 which serve to guidably direct the floor covering material 34 across the bottom of the cage. It will also be understood that the slots 42 shield the edges of the material 34 to prevent the bird or other caged animal from having access to such edges. This is a particularly important feature of the invention since I have discovered that one of the difficulties with the floor coverings heretofor used is that when edges are accessible to the caged bird, the bird frequently destroys the floor covering by picking and tearing the edges. I have also found that where the edges are protected as in this invention the birds leave the floor covering material alone and it therefore will serve its primary purpose of collecting dirt and other matter on the bottom of the cage rather than serve as a source of additional mess.

Directing attention to the compartment 26 it will be seen that this compartment has an upper portion 44 which is hinged as at 46 to a lower portion 48, whereby the upper portion may be pivoted to provide access to the internal chamber. The compartment 26 is provided with opposed apertures 50, 50 said apertures being arranged to receive a spindle 52 which extends along the long axis of the compartment 26. Directing attention to Figures 1 and 2 it will be seen that the spindle 52 is longitudinally slotted as at 54, said slot being arranged to receive the free end of floor covering material 34. It will be understood, however, that other conventional means may be employed to fasten the material to the spindle so that rotation of the latter will move the material.

Directing attention to Figures 3 and 5 it will be seen that the compartment 26 may be provided with a removable U-shaped tray 56 and that the sloted spindle 52 may receive a diametrically arranged bar 58 of a pivoting arrangement 60 consisting of a rotatable centrally apertured washer 62, the washer being confined between the walls 64, 64 which are located at one end of the compartment 26, said walls 64, 64 defining one of the apertures 50. This construction is also illustrated in Figure 2.

Considering the operation of the embodiment illustrated in Figures 1 to 5, it will be seen that the wall 14 adjacent to compartment 26 defines an elongated aperture 68 which generally parallels the long axis of the compartment 26. The floor covering material 34 may be manually threaded through the aperture 38 over the bottom 22 via the guide slots 42 and through the aperture 68 whereat the material may be registered in the slot 54 of the rotatable spindle 52.

It will also be noted that the bottom edge of the wall 14 immediately above the aperture 68 is serrated as at 70. When the bottom of the cage becomes dirty as heretofore explained, the animal keeper merely rotates the spindle 52 whereby the floor covering material 34 is moved across the floor 22 and rolled up on the spindle 52 with the dirty side of the material facing inwardly.

It will be understood that the dirt and other foreign matter on the floor covering 34 passes through the aperture 68 and is rolled up with the floor covering material on the spindle 52. This in effect "packages" the dirt and the like within the roll inside the compartment 26 and a clean floor covering is now provided above the floor 22. The dirty floor material is now stored in a sanitary, safe, out of sight condition until such time as the owner desires to dispose of the soiled material. It will be noted that the floor cover may be changed many times before it is necessary to dispose of the soiled material. When it is desired to dispose of the packaged dirt all that is required is that the lid 24 of compartment 26 be opened and the spindle 52 withdrawn from the compartment 26, whereupon the rolled up floor covering material will be received in the demountable tray 56. It will be understood that the bar 58 acts as an abutment to engage the edge of the material rolled up on the spindle 52 and prevent the material from being withdrawn with the spindle. It will also be understood that the spindle 52 may be provided with a taper toward the open end of the slot 54, to aid in preventing the floor covering material from binding on the spindle.

With the spindle removed the tray 56 may be lifted upwardly bringing the floor covering material 34 into engagement with the serrated edge 70. The edge 74 of the tray 56 and the edge 70 act in scissor-like fashion to cut the floor covering material 34. The tray 56 and the packaged dirt therein may then be removed without fuss or bother and without the danger of spillage to an appropriate disposal area.

Directing attention to Figures 6 and 7, it will be seen that the embodiment here illustrated is similar in most respects to the embodiment of Figures 1 through 5. Accordingly, identical parts have been identified with identical numerals. It will be seen, however, that the compartment 26 is provided with separable holes 80, 80 at opposite ends thereof whereby the spindle is guided for rotary movement. Additionally, guiding slots 82, 82 are provided in a knife member 86, said slots receiving guide pins 84. The knife 86 is spring supported as at 88, 88 whereby the knife is located immediately above the floor covering material 34 adjacent the aperture 68.

The operation of this embodiment is substantially similar to that heretofore described, in that the floor covering material 34 and the dirt thereon is rolled up on the spindle 52. When it is desired to remove the packaged dirt the vertically movable knife 86 is moved downwardly to cut the floor covering material in the area of the aperture 68. The compartment 26 may be opened and the spindle 52 with the rolled material and packaged dirt thereon may be removed and carried to an appropriate disposal area. The soiled paper may then be removed from the spindle. If desired the spindle itself may be disposable.

Attention is now directed to Figures 8 and 9 wherein the numeral 100 indicates the lower section of the cage. A slot 102 is provided on one side of the cage to telescopically receive a cage bottom 104.

Figure 9 shows that the bottom 104 is provided with aligned spindle slots 108, 108. A spindle 110 is demountably positioned within the slots 108. A sheet of paper, preferably in a flat condition, 112, may be disposed to cover the cage bottom 104. Means such as slot 114 provide connection between the adjacent edge of the paper 116 and the spindle 110.

As heretofore described, rotation of the spindle 110 and the undershot wrapping contact of the paper with the outside of the spindle provides for the packaging of the dirt accumulated on the paper.

In both embodiments, after removal of the soiled material, the floor covering material is again secured to the repositioned spindle and the operation may be repeated to keep the cage bottom in a virtually clean condition.

It will be seen that I have provided a new and novel animal cage arrangement which remedies conditions heretofore mentioned and considerably eases the cleaning tasks of the owners of various types of pets. It will be understood that the invention disclosed is by way of illustration and not limitation and may be subject to various modifications without departing from the spirit thereof or the scope of the appended claims.

I claim:

In an animal cage, a bottom for said cage, movable material to cover the bottom, said material being arranged to catch foreign matter deposited in the cage, said cage having a material discharge opening at one edge of said bottom, a rotatable material take-up spindle, means to secure the material to the spindle, the upper surface of said material underlying said spindle and engaging the outer surface of said spindle, said spindle being located outboardly of said one edge when in operative rotative position whereby upon rotation of said spindle said material is removed from the cage bottom and wrapped on the spindle entrapping said matter.

References Cited in the file of this patent

UNITED STATES PATENTS

| | | |
|---|---|---|
| 1,815,467 | Craig | July 21, 1931 |
| 2,065,923 | Jessen | Dec. 29, 1936 |
| 2,129,786 | Sacre | Sept. 13, 1938 |
| 2,151,064 | Alexander | Mar. 21, 1939 |
| 2,189,449 | Morris | Feb. 6, 1940 |
| 2,214,462 | Hill | Sept. 10, 1940 |
| 2,738,763 | Bowes | Mar. 20, 1956 |